Oct. 19, 1971  G. H. STRAM ET AL  3,613,131
DENTAL CUSPIDOR

Filed May 19, 1970  3 Sheets-Sheet 1

INVENTORS
GEORGE H. STRAM
RALPH J. WILLIAMS
GEORGE E. ALTLAND
THOMAS J. DUNN

BY
ATTORNEY

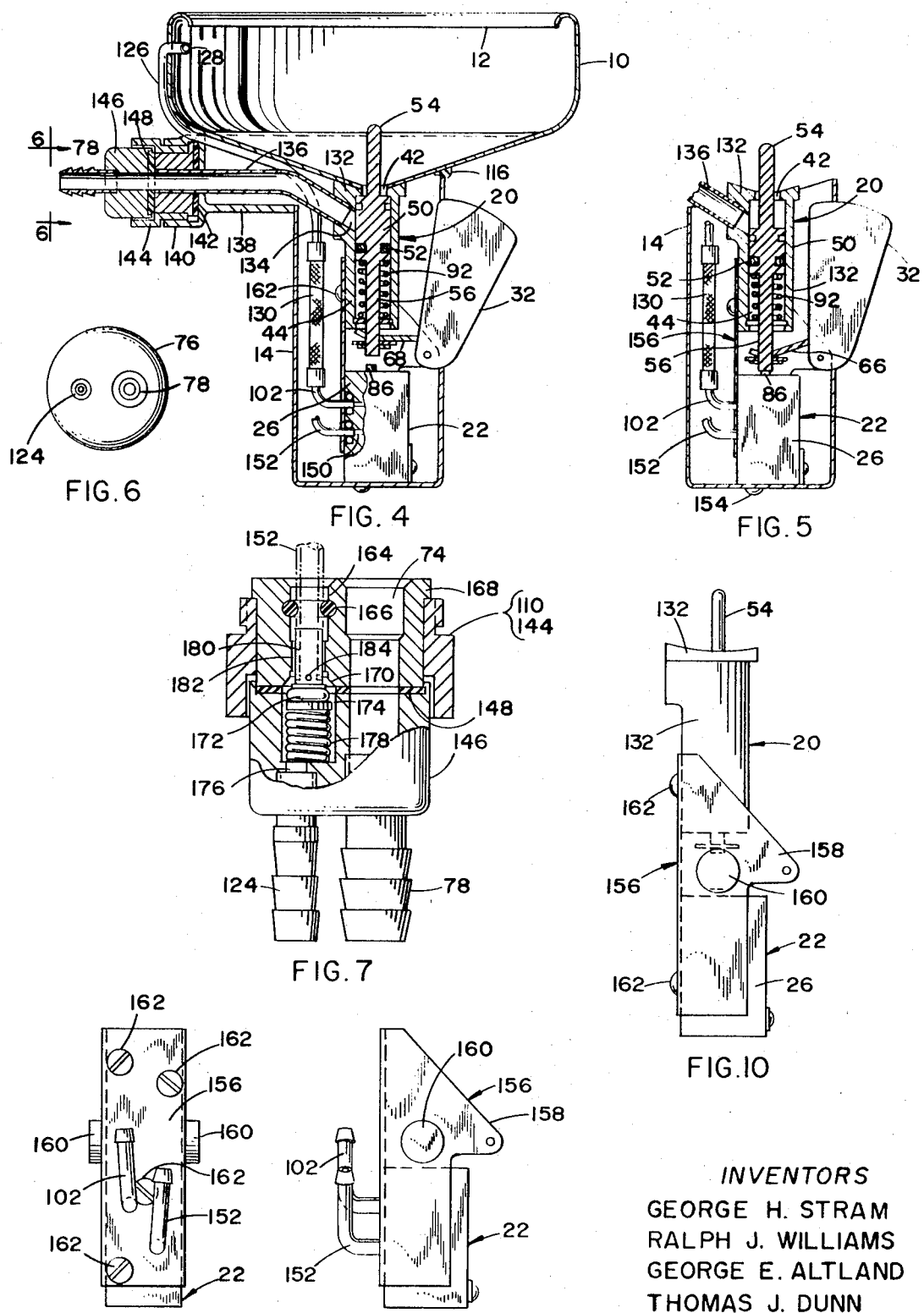

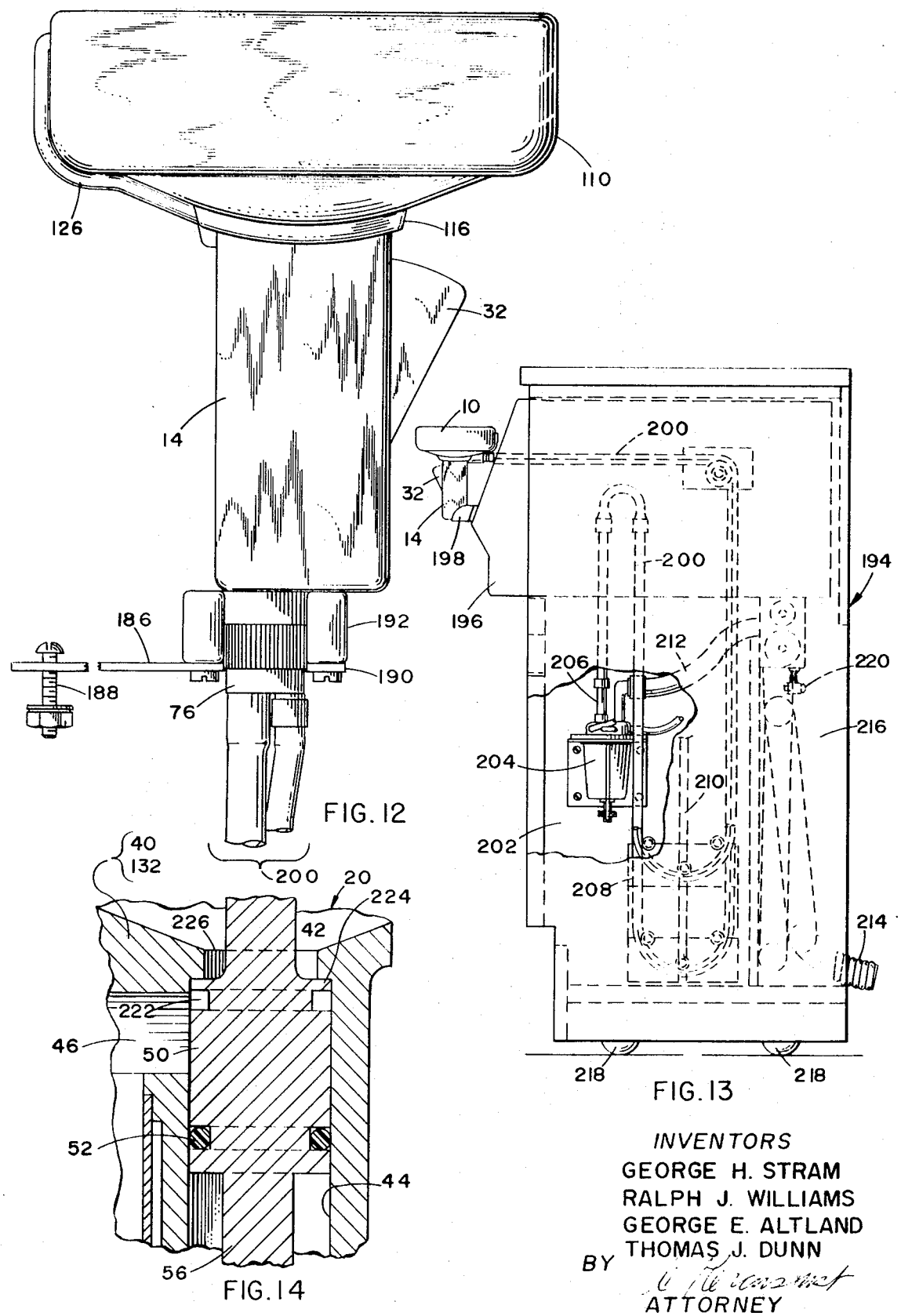

United States Patent Office 3,613,131
Patented Oct. 19, 1971

3,613,131
DENTAL CUSPIDOR
George H. Stram, York, Ralph J. Williams, New Oxford, George E. Altland, Dover, and Thomas J. Dunn, Red Lion, Pa., assignors to Dentsply International, Inc., York, Pa.
Filed May 19, 1970, Ser. No. 38,769
Int. Cl. A61c *17/04*
U.S. Cl. 4—263　　　　　　　　　　　　　　17 Claims

ABSTRACT OF THE DISCLOSURE

A portable dental cuspidor connected to sources of vacuum and water and including a drain control valve and a water control valve, and valve actuating means operable to open the drain control valve to evacuate the cuspidor bowl prior to introducing flushing water to the bowl.

CROSS-REFERENCE TO RELATED APPLICATION

The portable dental cuspidor comprising the subject matter of the present invention is adapted for use with a dental console of the type comprising the subject matter of pending application Ser. No. 498,547, filed Oct. 20, 1965.

BACKGROUND OF THE INVENTION

Various types of portable dental cuspidors have been developed in recent years due to the increasing trend to provide maximum comfort for a dental patient, as well as to render the services of the dentist more efficient. Such cuspidors usually are supported by the patient during use thereof and the flow of flushing water similarly is controlled by a valve directly associated with the cuspidor and provided with actuating means operated by the patient. Discharge from the cuspidor bowl in certain of the prior devices relied primarily upon gravity flow to an appropriate sewer connection. In the more recent portable cuspidors of this type, however, it has been preferred to connect the discharge from the cuspidor bowl to a source of vacuum prior to being discharged to a sewer connection. By using this latter type of discharge, removal of the flushed material from the cuspidor bowl is assured, regardless of whether the normal flexible discharge conduit is inclined downwardly toward the sewer connection or otherwise.

In view of the fact that adequate flushing of the cuspidor requires the supply of water to the bowl thereof, certain problems have been presented with respect to providing a flexible water delivery conduit as well as a flexible discharge conduit from the bowl of the cuspidor. Certain arrangements have been provided in prior devices to accommodate both types of flexible conduits. One such prior device is shown in Pat. No. 3,226,733, in the name of Ashton, dated Jan. 4, 1966. Another device of this nature is shown in Pat. No. 3,295,148, Deeley, Jr. et al., dated Jan. 3, 1967. Although these devices have certain desirable attributes, there are other features in them in regard to which improvement is desired and particularly in regard to the control and the operation of the valves and other features by which flushing water is furnished to the bowl of the cuspidor and withdrawal of waste material is effected by suction.

SUMMARY OF THE INVENTION

It is the principal object of the present invention to provide a portable dental cuspidor which is light in weight, comfortable while being held by a patient and includes control valves which readily are operated by the patient respectively to establish connection of a source of vacuum to the drain of the bowl of the cuspidor and initiate the flow of flushing water only after such vacuum discharge has been established with respect to the cuspidor bowl.

It is another object of the invention to arrange an appropriate discharge control valve and water flow-control valve in such manner that the sequential operation thereof described above is effected automatically.

It is a further object of the invention to provide means on the initially operated discharge control valve that will actuate the water flow control valve after the discharge control valve has been at least partially opened and vacuum has been connected to the same so as to insure positive withdrawal of all waste material and/or flushing water which is deposited in the bowl of the cuspidor.

Still another object of the invention is to provide simple yet effective and economical coupling means by which a compound type of flexible conduit, which includes a water delivery tube and a waste discharge tube, is quickly and safely connected at one end to a combination cuspidor bowl and handle structure, the water-conducting tube connection including a check valve which automatically is opened when connection of said compound conduit to said bowl and handle assembly has been completed and, conversely, when the flexible conduit is disconnected from the bowl and handle assembly, the check valve automatically closes to prevent the escape of flushing water which normally is supplied under pressure to the water-conducting tube of said compound flexible conduit, thereby eliminating the need to close a main supply valve in the water system, when the cuspidor is disconnected from the flexible conduit, for example.

A still further object of the invention is to provide a simple yet comfortable and effective type of finger-operable lever arrangement by which the valve means of the cuspidor are operated by the patient.

Details of the foregoing objects and of the invention, as well as other objects thereof, are set forth in the following specification and illustrated in the drawings comprising a part thereof.

DESCRIPTION OF THE DRAWINGS

FIG. 4 is a vertical sectional elevation of another embodiment of cuspidor having a different position for attachment of the conduits thereto from the embodiment shown in FIG. 1.

FIG. 5 is a fragmentary vertical elevation of the valve arrangement shown in FIG. 4, but showing the valves in open position.

FIG. 6 is an end view of the coupling means connectable to the ends of water and vacuum conduits employed with the cuspidor, as seen on the line 6—6 of FIG. 4.

FIG. 7 is an enlarged side elevation of the coupling member to which one end of the water and suction conduits are connectable, said view being on a larger scale than employed in FIGS. 1 and 4 and being partially sectioned to illustrate details of a check valve therein.

FIG. 8 is a side elevation of another embodiment of bracket means illustrated as being connected to the water valve and showing inlet and outlet conduits connected to said valve.

FIG. 9 is a front elevation of the bracket and water valve illustrated in FIG. 8.

FIG. 10 is a view similar to FIG. 9, but additionally illustrating the drain control valve also connected to the bracket for common support thereby with the water control valve.

FIG. 12 is an enlarged side elevation of a cuspidor of the type shown in FIG. 1 shown as being supported by a simple bracket attachable to any convenient location in a dental operatory.

FIG. 13 is a side elevation of the cabinet shown in FIG. 11, part of the side wall thereof being broken away to illustrate in full lines certain details of part of the drain and discharge mechanism associated with the cuspidor.

FIG. 14 is an enlarged fragmentary vertically sectioned detail of the drain control valve.

DESCRIPTION OF THE PREFERRED EMBODIMENTS

Figure 1:
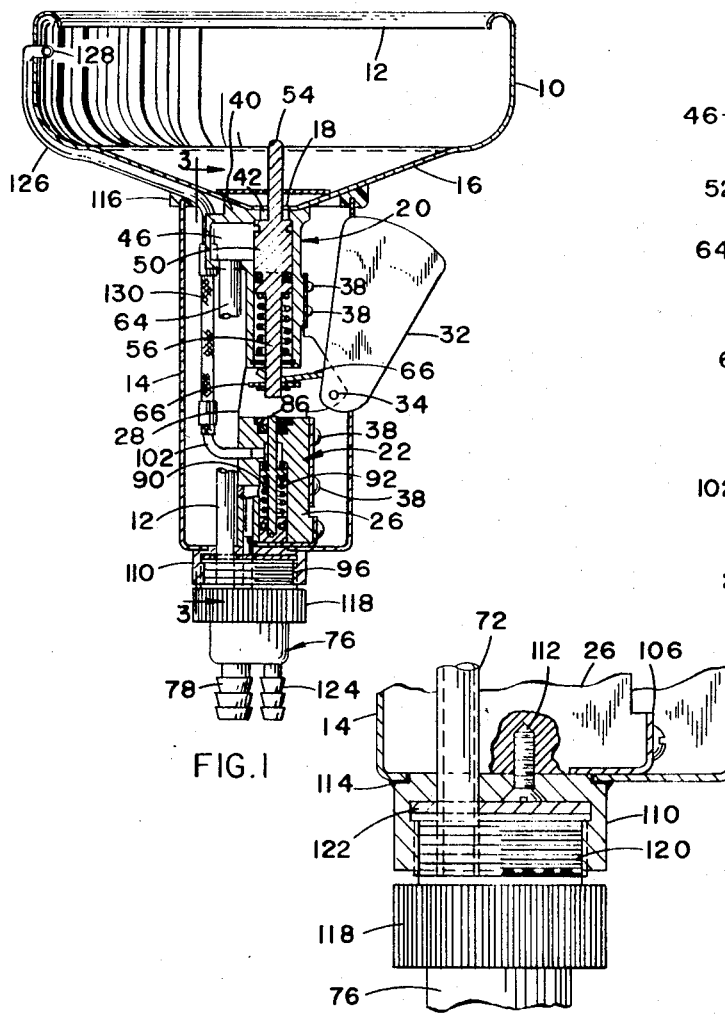
FIG. 1 is a vertical sectional view of one embodiment of portable dental cuspidor embodying the principles of the present invention.

Referring to the embodiment of the invention shown in FIG. 1, the cuspidor comprises a suitable bowl 10 which may be formed from any suitable material such as metal, ceramic, synthetic resin or the like. The upper edge 12 preferably is inturned to prevent any accidental discharge of flushing water by overflow, splashing or otherwise. A handle shell 14 is suitably shaped for comfortable grasping by the user and may be formed from material similar to that from which the bowl 10 is formed, if desired. The bowl 10 also is provided with a bottom 16 which preferably slopes downwardly toward the center and has a discharge opening 18 through which water and debris exit from the bowl 10.

The bowl 10 and handle 14 are referred to hereinafter and in the appended claims as a bowl and handle assembly. The handle shell 14 is secured to the bowl by means described in detail hereinafter and it encloses a drain control valve 20 and a water control valve 22. Said valves preferably are in axial alignment with each other and also are substantially parallel to the axis of the handle shell 14. These valves respectively have valve bodies 24 and 26 which may be formed from any suitable material such as metal, synthetic resin or otherwise. Extending between said valve bodies is a connecting and supporting bracket 28 which is durable and preferably formed from metal. In cross-section, the bracket 28 is U-shaped and the opposite sides thereof have ears 30 projecting from similar side edges which are parallel to each other. One end of operating lever 32 is positioned between ears 30 for pivotal connection thereto by a pin 34 which extends through axially aligned holes in said ears and operating lever 32. Connecting webs 36 of bracket 28, which extend between the sides thereof, are provided with a plurality of holes for the reception of connecting screws 38 which are threaded into the bodies 24 and 26 of the drain valve 20 and water valve 22 and thereby serve to form a rigid valve assembly.

Figure 2:
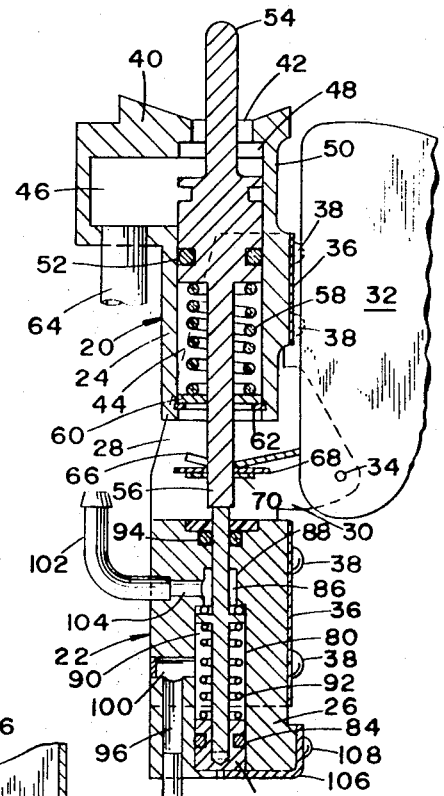
FIG. 2 is a fragmentary vertically sectioned view showing details of the valve arrangement for controlling the supply of water and discharge from the cuspidor shown in FIG. 1, but on a larger scale than in FIG. 1, and showing the valves in open position.

The body 24 of the drain valve preferably is formed by molding or casting, depending upon the material used to form it. Referring particularly to FIG. 2, the upper end 40 has a contour complementary to the central portion of the bottom 16 of bowl 10, to which it is fixedly connected by any suitable means such as solder or brazing, if metal is used to form the components, or by cement, screws or otherwise if other materials are used. As a result, the valve assembly described immediately above and the bowl 10 of the cuspidor comprise a rigid unit. The upper end 40 of valve body 24 also has an inlet opening 42 therein which is complementary in size to the discharge opening 18 in the bottom 16 of bowl 10 and is coaxial therewith, as clearly shown in FIG. 1.

DRAIN CONTROL VALVE

Referring particularly to FIG. 2, the body 24 of the drain control valve has a cylindrical bore 44 which intersects an interior chamber 46, and an extension 48 of bore 44 is coaxial with said bore and also with the inlet opening 42 in the upper end 40 of valve body 24. The valve bore 44 accommodates a valve member 50 which is somewhat in the nature of a piston. An O-ring is disposed within an annular channel within valve member 50 and effects a seal between valve member 50 and the bore 44.

Valve member 50 also has an extension 54 projecting from one end thereof through the inlet opening 42 and into the bottom portion of bowl 10 of the cuspidor, as as shown in FIG. 1. Extension 54 is coaxial with valve member 50 and the opposite end of the valve member has a coaxial rod 56 disposed within bore 44. A compression spring 58 surrounds rod 56 and abuts against a washer 60 through which rod 56 extends. Said washer is maintained in operative position within the lower end of bore 44 by means of a snap ring 62. The opposite end of spring 58 abuts one end of valve member 50 and normally urges the opposite end of the valve member into the extension 48 of bore 44 which, when so-positioned, effects closing of the valve. Chamber 46 has an outlet opening therein with which a discharge conduit 64 communicates.

When it is desired to open the drain control valve 20, lever 32 is moved counterclockwise, as visualized in FIGS. 1 and 2, to depress the same into handle shell 14. Said lever has a bell crank extension 66 which is fork-shaped in plan view and projects laterally from the axis of the lever for abutting engagement with an abutment washer 68 which is maintained in fixed position upon rod 56 by a cotter pin 70.

The drain control valve 20 will remain open as long as the operator holds the lever 32 in the so-called depressed position which is illustrated in FIG. 2. The force of spring 58 is relatively light and thus does not require exertion of any substantial force to retain the valve in open position. However, upon release of the lever 32, spring 58 immediately restores the valve member 50 to closed position, in which the upper end thereof, as viewed in FIG. 2, is seated within the extension 48 of bore 44. Such movement correspondingly moves the lever 32 to its extended or starting position, such as shown in FIG. 1.

The extension 54 on valve member 50 is a predetermined diameter with respect to inlet opening 42 and coaxial discharge opening 18 for purposes of providing an annual discharge or drain opening which is of a predetermined width calculated to prevent passage therethrough of particulate matter in excess of a certain diameter. This arrangement constitutes a safety factor to prevent the accidental passage of nonwaste material or items such as inlays, jacket crowns and the like, which sometimes are accidentally deposited in a cuspidor by a patient during the fitting of such items into preparations in teeth to receive the same.

In the embodiment of the invention shown in FIGS. 1 and 2, discharge of waste material from the cuspidor bowl 10 occurs when the valve 20 has been opened in the manner described above to provide a passage for such material between extension 54 of valve member 50 and the perimeter of openings 18 and 42 which communicates with interior chamber 46 and discharge conduit 64. Said conduit has an extension 72, shown in FIG. 1 which is in broken relationship with respect to conduit 64 for purposes of clearly illustrating other details of the mechanism. The terminal end of extension 72 projects through the handle shell 14 and is received within bore 74 of coupling assembly 76, details of which are best shown in FIG. 7. Bore 74 communicates with hose barb 78 as shown in FIGS. 1 and 7.

WATER CONTROL VALVE

Referring particularly to FIGS. 1 and 2, structural details of the water control valve 22 are illustrated. Said valve comprises a body 26 into which screws 38 are threaded to secure said body to the web 36 of supporting bracket 28. Particularly as may be seen from FIG. 2, the body 26 has a bore 80 therein, the lower end of which receives a stationary guide plug 82. O-ring 84 seals the same against the passage of water from the lower end of the bore. The lower end of the valve stem 86 is slidably disposed within plug 82 and the upper end of said valve stem extends through a bore extension 88 which provides an annular shoulder against which valve member 90 on valve stem 86 abuts when the valve is closed. A compression spring 92 extends between plug 82 and the valve member 90 so as normally to urge the valve toward closed position. The upper end of the valve stem projects beyond the upper end of the valve body 26 and an O-ring 94 surrounds the stem to prevent the leakage of water from the upper end of valve body 26.

The valve body 26 also is provided with a suitable water inlet, the exemplary showing of which in FIG. 2 comprises a longitudinally extending bore 96 into which the discharge end of a delivery tube 98 is fixed. A transverse bore 100, which is plugged at its outer end, extends between bore 96 and bore 80 for the passage of water therethrough and discharge of the same through discharge conduit 102, which is fitted into bore 104. A clip 106 is secured to the lower end of valve body 26 by means of a screw 108, particularly to retain plug 82 in operative position within the lower end of bore 80.

Figure 15:
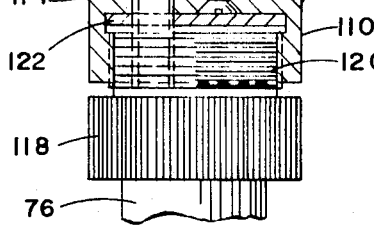
FIG. 15 is a partially sectioned elevation of a detail of the embodiment shown in FIG. 1.

Referring to FIG. 15, it will be seen that a female ferrule 110 is secured by a small screw 112 to the lower end of valve body 26. Further, the lower end of handle shell 14 has a hole therein into which the upper end of ferrule 110 is fitted and to which it is firmly fixed by solder 114 or otherwise. Accordingly, the screw 112 serves to connect the handle shell 14 firmly to the assembly of valves 20 and 22 which are connected together by supporting bracket 28 and the upper end of valve body 24, as indicated above, is fixedly secured to the bottom 16 of cuspidor bowl 10. Incident to securing the handle shell 14 to the cuspidor bowl 10, however, a suitable yieldable gasket 116 is applied to the upper end of the handle shell 14 and the connection of the shell to the valve assembly forces the gasket 116 into firm engagement with the exterior surface of the bottom 16 of the bowl 10.

The coupling assembly 76 has an externally knurled surface 118 and an externally threaded extension 120 which engages complementary internal threads in the female ferrule 110. Also, the female ferrule 110 has a seat against which gasket 122 is disposed, the same also covering the head of screw 112. An appropriate hole therein accommodates the extension 72 of discharge conduit 64. Such an arrangement therefore provides an adequate support for the hose barb 78 to which a flexible discharge conduit is connected and an additional hose barb 124 to which a flexible water supply conduit is connected.

In regard to the embodiments shown in FIGS. 1 and 2, water is delivered to the interior of cuspidor bowl 10 by a rigid tube 126 which is fastened to the outer lower surface 16 of bowl 10, the upper end 128 extending through the wall of the bowl 10 and being directed tangentially so that the discharge therefrom effects a swirling motion to provide adequate washing of debris from the bowl 10 into the discharge inlet opening 42. The opposite end of the tube 126 extends downwardly into the interior of handle shell 14, the gasket 116 having an appropriate notch therein to accommodate said tube. The lower end of the tube has a flexible connector conduit 130 which is connected thereto and extends to the water discharge conduit 102 which is supported by the valve body 26 of water control valve 22.

OPERATION OF THE CUSPIDOR—FIG. 1

When it is desired to initiate operation of the embodiment of the cuspidor shown in FIG. 1, it is removed from a suitable support, such as that described hereinafter with respect to FIG. 12. Normally, the handle 14 is held by the patient. The cuspidor is of light weight and no appreciable exertion is required to support it. When it is desired to use the cuspidor incident to expectorating, the patient merely presses the operating lever 32 inward. Such movement initially opens the drain control valve 20 by lowering the valve member 50 to the exemplary open position shown in FIG. 2. Previous to this occurring, a suitable suction pump, not shown, which is located in the lower portion of the cabinet shown in FIG. 13, for example, has been placed in operation, whereby as soon as there is the slightest space occurring between the valve member 50 and its seat, suction will begin to be applied to the interior of the bowl, even before water discharge therein is initiated. This is due to the fact that, as seen in FIG. 1, there is a short space between the lower end of rod 56 of the valve member 50 of the drain control valve 20 and the upper end of valve stem 86 of the water control valve. However, after the operation of suction has been initiated in the bowl 10, the engagement of the rod 56 of the drain control valve with the upper end of valve stem 86 of the water control valve occurs and continued movement of the drain control valve member 50 to open position serves to move the valve member 90 of the water control valve away from its seat and thereby initiates discharge of water from the end 128 of tube 126, said water being delivered from delivery tube 98 which, as indicated above, is connected to a suitable supply.

By the foregoing arrangement, it will be seen that withdrawal of all water discharged from end 128 of the tube 126 will be effected by suction due to the initial operation of the suction arrangement prior to the discharge of water being initiated. Further, the inturned upper edge 12 of the bowl 10 insures that there will be no accidental discharge of water from the rim of the bowl. Discontinuance of operation of the cuspidor is effected simply by releasing the operating lever 32, whereupon the restoration of valve member 50 to its closed position in the drain control valve body raises the inner end of bell crank extension 66 of the lever 32 and thus projects the lever to its projected, starting position.

Figure 3:
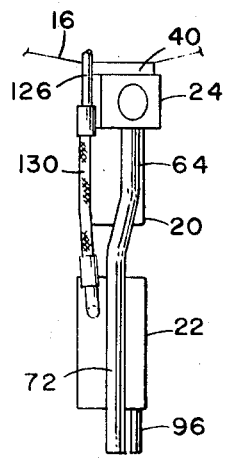
FIG. 3 is a fragmentary side elevation of the valve arrangement shown in FIG. 1 as seen on the line 3—3 of said figure.

In FIG. 3, the combination of valves 20 and 22 is shown as viewed from the left-hand side of the arrangement in FIG. 1. The view in FIG. 3 therefore primarily illustrates the arrangement of the flexible connector conduit 130 and particularly the discharge conduit 64, 72, which actually is a continuous conduit. Therefore, the arrangement of FIG. 3 primarily is somewhat diagrammatic.

OPERATION OF THE CUSPIDOR—FIG. 4

The principal difference in structure between the cuspidors respectively shown in FIGS. 1 and 4 is that, in FIG. 1, the water inlet conduit 96 and discharge conduit 64 are disposed at the so-called lower end of the handle 14, when considered in its normal position in use, whereas in FIG. 4, these conduits extend radially with respect to the axis of the bowl 10 of the cuspidor. Therefore, for convenience, the elements described above with respect to FIG. 1 which are common to the embodiments shown in FIG. 4 have been given the same reference characters in FIG. 4. The drain control valve 20 is substantially the same except that the valve body 132 is a casting but is shaped differently to provide an annularly arranged discharge port 134 into which one end of discharge conduit 136 is secured suitably, such as by soldering, cement or otherwise. Said discharge conduit extends radially with respect to the axis of handle 14 of the cuspidor. Also, the shell which defines the handle 14 is modified at one side of the upper end thereof to include another casting 138 which is firmly attached to the handle shell by suitable means such as solder, cement or otherwise. The casting 138 terminates in a female ferrule 140 which is internally threaded at its outer end and has an interior seat which receives a gasket 142 against which externally threaded extension 144 on coupling member 146 abuts. As best shown in FIG. 4, the coupling member 146 and the extension 144 thereon are separately made but are connected suitably, by threading, cementing or otherwise, to position another gasket 148 therebetween. The coupling member 146 supports a discharge hose barb 78 and a water inlet hose barb 124, the latter being best shown in FIG. 6, which is an end view of the hose coupling 76 arrangement as seen on the line 6—6 of FIG. 4.

The water control valve 22 is different only in regard to the water inlet orifice 150 thereof extending laterally into the body 26 of valve 22 for reception of a water inlet tube 152 in liquid-sealing manner by means either of an O-ring shown in FIG. 4 or by being soldered thereto.

In FIG. 4, the drain control valve 20 is shown in closed position and the water control valve 22 is similarly positioned. Under the circumstances, the lower end of rod 56 of valve 20 is out of contact with the rod 86 of the water control valve 22. In addition, the operating lever 32 is extended to inoperative position. However, in FIG. 5, the handle 32 has been depressed inwardly for purposes of opening both the drain control valve 20 and water control valve 22. Accordingly, the bell crank extension 66 of lever 32 has engaged the valve member 50 and moved it to open position and sufficient movement thereof toward the water control valve 22 has brought the rod 56 of the drain control valve 20 into engagement with the upper end of valve stem 86 of the water control valve 22 and it will be understood that the water control valve 22 has been moved to open position which is similar to that illustrated in FIG. 2, but for purposes of simplicity, the details of valve 22 are not illustrated in FIGS. 4 and 5.

Several other differences between the embodiment of cuspidors shown respectively in FIGS. 1 and 2 and that shown in FIGS. 4 and 5 comprise the latter embodiment being arranged for the handle shell 14 to be secured directly to the lower end of the water control valve body 26 by means of screw 154 which is threaded into an appropriate hole in said body, the screw head being external of the handle shell 14 for ready engagement. Also, a connecting bracket 156, which is U-shaped in cross-section, is employed between the drain control valve 20 and water control valve 22, the side view thereof shown in FIGS. 9 and 10 best indicating the shape thereof but, at least in general operative function, said bracket 156 is substantially the equivalent of bracket 28 shown in FIGS. 1 and 2 and the function thereof is the same, namely, to support the two valves in rigid, axially aligned relationship with respect to each other. It will be seen especially from FIGS. 9 and 10 that the parallel opposite sides of the bracket 156 have ears 158 which support the operating lever 32 pivotally. Also, for purposes of bracing the adjacent opposite side walls of the handle shell 14, the parallel opposite sides of both the brackets 28 and 156 have inserts 160 suitably attached thereto, the distance between the outer end faces of the pair of inserts 160 being equal to the transverse space between the inner surfaces of said side walls of the handle shell 14. Suitable screws 38 and 162 securely connect the valves 20 and 22 to the intermediate connecting wall of the U-shaped brackets 28 and 156.

Though not shown in details in FIGS. 4 and 5, it will be understood that the water inlet tube 152 which enters the water control valve body 26 extends upwardly within the handle shell 14 and at the upper end thereof, a flexible hose, not shown, extends from inlet tube 152 to a suitable external hose coupling, not shown, adjacent coupling member 146. As viewed in FIG. 4, the barb 124 shown in FIG. 7 lies directly behind the barb 78. Thus, essentially, the operation of the embodiment shown in FIGS. 4 and 5 is the same as that shown in FIGS. 1 and 2 with respect to opening the drain control valve 20 before the water control valve 22 is opened when the operating lever 32 is depressed into the handle shell 14. The advantages and attributes of this operation are the same as that set forth above with respect to FIGS. 1 and 2.

CHECK VALVE FOR WATER SUPPLY

Referring to FIG. 7, an enlarged, partially sectioned view of coupling assembly 76 is illustrated and the details thereof are the same as illustrated in FIG. 4. However, it is to be understood that certain check valve details hereinafter described with respect to the structure of FIG. 7 are equally applicable to the coupling assembly 76 of the embodiment shown in FIG. 1. In FIG. 7, the inlet end of water inlet tube 152 is shown in phantom as being received within a bore 164, within which a sealing O-ring 166 is positioned. The body 168 to which the externally threaded extension 144 is connected integrally is provided with a valve seat 170. A spring-pressed valve member 172 is positioned within a bore 174 formed within the coupling member 146 and in communication with water inlet opening 176 therein. One end of spring 178 abuts against the bottom of bore 174 and the opposite end thereof abuts a suitable flange adjacent the valve member 172. The latter, incidentally, may comprise an O-ring if desired. It engages seat 170 when closed.

An extension 180 on valve member 172 extends through another bore 182 which has a smaller diameter than bore 174 in order to form the valve seat 170. Extension 180 is axially bored from the outer end thereof and a plurality of radial ports 184 are drilled inwardly to communicate with the bore in extension 180 and thus form passages for water when moving between hose barb 124 and water inlet tube 98 or 152. In FIG. 7, the valve 172 is shown in open position. It is held in this position by the engagement of the terminal end of water inlet tube 152, with the upper end of extension 180. The amount that the terminal end of water inlet tubes 98 and 152 extend beyond the female ferrule 140 when the coupling assembly 76 is disconnected therefrom is such that when the coupling assembly 76 with its threaded extension 144 are connected to the female ferrule 140, the insertion of the terminal end of water inlet tube 152 into bore 164 would effect opening of the valve 172 with respect to its seat 170.

Conversely, when the coupling assembly 76 with extension 144 is disconnected from the female ferrule 140, the withdrawal of the terminal end of water inlet tube 152 from bore 164 will result in spring 178 moving valve member 172 to closed position against the seat 170 and thus prevent the spraying of water from the water inlet tube connected to barb 124 which, otherwise, would necessitate the closing of a control valve in the supply line somewhere which usually is at a distance from the cuspidor and otherwise inconvenient to operate. The provision of valve 172, therefore, essentially is a safety means as well as a device for preventing the occurence of undesired wetting of the apparatus and the surroundings when disconnecting the cuspidor from its supply lines.

ADDITIONAL FEATURES

Referring to FIG. 12, a cuspidor of the type illustrated in FIGS. 1 and 2 is shown supported by a relatively simple bracket 186 which is connectable at one end by a bolt 188, or otherwise, to any suitable location in a dental operatory. It is preferred that the bracket 186, which is an arm of desired length, be positioned substantially horizontally. The outer end 190 of the bracket 186, in plan view, is substantially U-shaped and a correspondingly shaped collar 192, which, for example, may be molded from yieldable material such as a suitable synthetic resin.

The collar 192 is secured to the outer end 190 of bracket 186 by appropriate screws or the like and said collar 192 receives the coupling assembly 76 of the cuspidor preferably with a slight frictional fit to prevent accidental falling of the cuspidor from the bracket.

Figure 11:
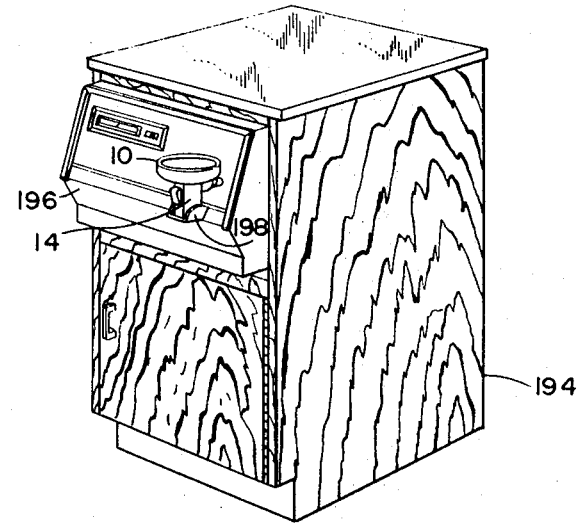
FIG. 11 is a perspective view of an exemplary cabinet adapted to support especially the embodiment of cuspidor illustrated in FIG. 4.

Referring to FIGS. 11 and 13, it will be seen that the embodiment of the cuspidor shown in FIGS. 4 and 5 is of the type adapted to be supported by a cabinet 194. Said cabinet, for example, may be provided with an upper compartment 196 which, in addition to supporting the cuspidor 10, also may support other dental instruments, not shown. The front face of upper compartment 196 also is provided with a suitable receptacle bracket 198 which receives the lower end of the handle 14 of the cuspidor. Due to the fact that the waste and water supply conduit 200 is connected to the laterally extending coupling assembly 76 shown in FIG. 4, the conduit 200 readily may be pulled from storage position within the cabinet 194, including both the upper compartment 196 and the lower compartment 202. Preferably, the conduit 200 is of a composite nature and the tubes thereof which respectively conduct the waste material away from the cuspidor and deliver flushing water thereto may be suitably connected together or encased within an appropriate cover, such as either a braided enclosure or a flexible tubular sheath made from appropriate material.

As illustrated in FIG. 13, the exemplary cabinet, in the lower compartment 202, has a solids collector 204 of the type, for example, illustrated and claimed in Patent No. 3,482,313. Said collector has an inlet 206 to which the discharge end of the waste tube of conduit 200 is connected. In order that the conduit 200 may be easily and automatically retracted into the cabinet 194 following use of the cuspidor 10, FIG. 13 illustrates in exemplary manner an appropriate retracting weight 208 around which a lower loop of the conduit 200 passes, the vertical movement of the weight being guided by suitable tracks 210. The inlet end of the water tube of conduit 200 is connected to any suitable source of water, such as from a municipal supply, and an appropriate conduit and valve, not shown, is provided within the cabinet 194 for connection to such supply.

The solids collector 204 discharges waste liquids through conduit 212 which communicates with a coiled flexible discharge conduit 214 disposed within a compartment 216 provided in the rear portion of the lower compartment 202 of the cabinet 194. The cabinet, incidentally, is preferably portable, as will be seen from the exemplary casters 218 in FIG. 13. Accordingly, the flexible conduit 214 is of sufficient length that several coils thereof may be supported in an extensible manner rearwardly from the cabinet 194. The delivery end thereof is attached to a suitable sewer connection in the wall of the operatory or otherwise. The coiled conduit tube 214, substantially intermediately of the ends thereof, is supported by a retractable flexible support means similar to the devices used on the gasoline pump hoses in auto service stations. Accordingly, after moving the cabinet 194 to a convenient location in the operatory, the same may be moved to its normal inoperaitve position in the operatory and incident thereto, the flexible conduit 214 will automatically be recoiled into the rear compartment 214 of the cabinet 194.

Referring to FIG. 14, another feature is shown which is not illustrated in the preceding figures. It will be seen that FIG. 14 is on a scale greatly enlarged over the other figures and comprises a fragmentary portion of the drain control valve 20 and particularly the upper end of valve member 50. The feature comprising the novel subject matter of FIG. 14 is applicable to either of the embodiments of cuspidor respectively shown in FIGS. 1 and 2, and in FIGS. 4 and 5.

In FIG. 14 as well as in FIGS. 1, 2, 4 and 5, it will be seen that the upper portion of the valve member 50 has an annular groove 222 extending therearound and, in conjunction with the upper end of valve member 50, defines a circular, radial flange 224. The flange 224 is provided with a relatively narrow, radial notch 226 which communicates with annular groove 222 even when the valve member 50 is in its closed position as shown in FIG. 14. Thus, there is a small but continuous path from the lower portion 16 of the bowl 10, past valve member 50 by way of notch 226, and into either the waste removal chamber 46 or discharge conduit 136.

The arrangement illustrated in FIG. 14 primarily is for sanitation and safety purposes. The vacuum motor which provides suction for discharge conduit 64 and waste removal chamber 46 in the embodiment of FIGS. 1 and 2, of the discharge conduit 136 of the embodiment shown in FIGS. 4 and 5, will serve to withdraw the final residue of waste fluid and water from the cuspidor bowl through notch 226, after the valve member 50 has been moved to closed position. The water control valve 22 in both of the embodiments likewise will have been closed when this occurs. Such arrangement, therefore, provides a more sanitary type of operation of the cuspidor than would be possible if the radial notch 226 and its corresponding passageway were not provided. To this extent, the notch 226 provides what might be termed a bleed opening.

While the invention has been illustrated and described in its several preferred embodiments, it is to be understood that the same is not to be limited to the precise details herein illustrated and described since the same may be carried out in other ways falling within the scope of the invention as illustrated and described.

We claim:

1. A portable dental cuspidor comprising:
   (a) a bowl and handle assembly, the bowl having a drain opening in the bottom thereof,
   (b) plural conduit means connected at one end to said assembly and the other end of said conduits therein being connectable respectively to sources of water and vacuum,
   (c) a drain control valve connected between said drain in said bowl and said vacuum conduit means,
   (d) flushing water discharge means within said bowl,
   (e) a water control valve connected between said flushing water discharge means and said water conduit means,
   (f) valve actuating means carried by said bowl and handle assembly, and
   (g) means connecting said valve actuating means to one of said valves and adapted to operate the same in a manner to open said drain control valve prior to opening said water control valve, whereby ample removal of flushing water from said bowl is assured.

2. The cuspidor according to claim 1 further including means on the drain control valve positioned and operable to actuate the water control valve after said drain control valve has been at least partially opened.

3. The cuspidor according to claim 1 in which said drain control valve and water control valve are in axial alignment within the handle of said bowl and handle assembly.

4. The cuspidor according to claim 1 in which said valve actuating means is adjacent the bowl of said bowl and handle assembly.

5. The cuspidor according to claim 1 further including suction and water conducting means in said handle of said bowl and handle assembly, and coupling means on said plural conduit means operable to connect the same to terminal ends of said suction and water conducting means in said handle of said bowl and handle assembly.

6. The cuspidor according to claim 5 in which said coupling means is provided with a check valve operable to close when said coupling means is disconnected from said handle of said bowl and handle assembly.

7. The cupidor according to claim 6 further including check valve actuating means positioned in said water control valve and operable to open said check valve incident to the coupling means being connected to said handle of said bowl and handle assembly.

8. The cuspidor according to claim 1 in which said drain control valve comprises an axially movable plunger aligned with the means on said water control valve to actuate the same, said plunger of said drain control valve normally being spaced from said actuating means of said water control valve when said valves are closed, thereby to provide a delay in the opening of said water control valve until after the drain control valve has been opened at least partially when it is desired to activate said cuspidor.

9. The cuspidor according to claim 8 in which said water control valve is positioned adjacent the opposite end of said drain control valve from said bowl and includes an actuating plunger projecting toward said drain control valve for engagement by said plunger of said drain control valve when the latter has been moved a predetermined distance in opening direction.

10. The cuspidor according to claim 8 in which said drain control valve is secured to said bowl of said bowl and handle assembly and said cuspidor also including connecting means attached to and extending between said drain control valve and water control valve to dispose the same in predetermined fixed relationship, handle shell means shaped to enclose said drain control valve and water control valve, and means adapted to detachably secure said handle shell in operative relationship relative to said bowl, said handle shell being manually engageable by an operator to support said cuspidor.

11. The cuspidor according to claim 1 in which said drain control valve is adapted to be actuated initially by said valve actuating means and said cuspidor also including lost-motion means operated by said actuating means and adapted to open said water control valve only after said drain control valve has been moved a predetermined distance in opening direction.

12. The cuspidor according to claim 1 in which said drain control valve is directly connected to said bowl of said bowl and handle assembly and said drain control valve also including a valve member movably mounted therein and provided with a plunger projecting into the bowl of said bowl and handle assembly through said drain opening in the bottom of said bowl when said valve is closed, said drain opening being of a larger diameter than said plunger to provide a clearance space of restricted size to prevent the passage of solid matter therethrough larger than a predetermined cross-sectional dimension.

13. The cuspidor according to claim 12 in which said valve actuating means comprises a bell crank pivotally supported relative to said bowl and handle assembly and having one leg interengaging said plunger of said drain control valve and the other leg of said bell crank being arranged exteriorly of the handle of said bowl and handle assembly and adapted to be engaged manually by the operator for actuation of said drain control valve.

14. The cuspidor according to claim 13 in which said one leg of said bell crank comprises a yoke and said plunger of said drain control valve also has an abutment thereon engageable by said yoke for actuation of said plunger when said other leg of said bell crank is moved in valve-opening direction.

15. The cuspidor according to claim 13 in which said other leg of said bell crank extends upward toward the bowl of said bowl and handle assembly and the pivot of said bell crank is disposed adjacent the lower end of said one leg, said other leg of said bell crank also being positioned conveniently upon the handle of said bowl and handle assembly to be pressed toward said handle by a finger of an operator to move said drain control valve in a direction to open.

16. The cuspidor according to claim 1 in which said means connecting said valve actuating means to one of said valves also is operable to close said water control valve before said drain control valve is closed, and said drain control valve comprising a valve seat member and a valve member movable relative thereto, one of said members having a small clearance which is operable when said members are in engagement with each other to permit the passage of any final residue of liquid in said bowl to be withdrawn therefrom by vacuum when present in said conduit means.

17. The cuspidor according to claim 16 in which said small clearance in one of said valve members comprises a small radial notch in said valve member.

References Cited

UNITED STATES PATENTS

| | | | |
|---|---|---|---|
| 3,066,318 | 12/1962 | Albigese | 4—263 |
| 3,226,733 | 1/1966 | Ashton | 4—263 |
| 3,295,148 | 1/1967 | Deeley, Jr. et al. | 4—263 |
| 3,530,513 | 9/1970 | Maurer et al. | 4—1 X |

LAVERNE D. GEIGER, Primary Examiner

D. B. MESSENBERG, Assistant Examiner